United States Patent
Gregori

(10) Patent No.: US 7,154,377 B2
(45) Date of Patent: Dec. 26, 2006

(54) MOVABLE BARRIER OPERATOR COMPRESSED INFORMATION METHOD AND APPARATUS

(75) Inventor: Eric Gregori, Lindenhurst, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 198 days.

(21) Appl. No.: 10/748,847

(22) Filed: Dec. 30, 2003

(65) Prior Publication Data
US 2005/0149211 A1  Jul. 7, 2005

(51) Int. Cl.
*G05B 19/00* (2006.01)
*B60R 25/00* (2006.01)
*G06F 7/00* (2006.01)
*G08B 29/00* (2006.01)
*G08C 19/00* (2006.01)
*H04B 3/00* (2006.01)
*H04Q 1/00* (2006.01)

(52) U.S. Cl. ............... 340/5.7; 340/5.71; 340/5.61; 340/5.31; 340/686.1; 318/264; 318/267; 318/467; 318/565; 700/56; 700/60; 700/63

(58) Field of Classification Search .............. 700/47, 700/50, 59, 60–63, 65–66, 81–88; 318/264–267, 318/283–286, 484, 466–469, 565, 489; 340/5.61, 340/5.1, 531, 686.1
See application file for complete search history.

(56) References Cited

U.S. PATENT DOCUMENTS

| | | | | |
|---|---|---|---|---|
| 6,081,203 A | * | 6/2000 | Fitzgibbon | 340/825.72 |
| RE37,784 E | * | 7/2002 | Fitzgibbon et al. | 318/466 |
| 6,605,910 B1 | * | 8/2003 | Mullet et al. | 318/264 |
| 6,806,672 B1 | * | 10/2004 | Fitzgibbon et al. | 318/468 |
| 2004/0085036 A1 | * | 5/2004 | Hom et al. | 318/460 |
| 2004/0239482 A1 | * | 12/2004 | Fitzgibbon | 340/5.61 |
| 2004/0243813 A1 | * | 12/2004 | Farris et al. | 713/182 |
| 2005/0012631 A1 | * | 1/2005 | Gregori et al. | 340/686.1 |
| 2005/0269984 A1 | * | 12/2005 | Piechowiak et al. | 318/445 |

FOREIGN PATENT DOCUMENTS

EP  0809163 A3 * 7/1999

* cited by examiner

*Primary Examiner*—Ramesh Patel
(74) *Attorney, Agent, or Firm*—Fitch, Even, Tabin & Flannery

(57) ABSTRACT

In a movable barrier operator, data that corresponds to force requirements to effect desired movement of a movable barrier is compressed and stored for later retrieval. Multiple compression schemes and/or compression rates can be made available. Selection of a given scheme or rate can be determined on a user-directed or an automatic basis. Automatic selection in turn can be based on various criteria including, for example, presently available memory resources.

35 Claims, 2 Drawing Sheets

MOVABLE BARRIER OPERATOR COMPRESSED INFORMATION METHOD AND APPARATUS

TECHNICAL FIELD

This invention relates generally to movable barrier operators and more particularly to movable barrier operators that use force-related information.

BACKGROUND

Movable barrier operators of various kinds are known in the art. In general, such operators serve to effect selective movement of a movable barrier (including but not limited to garage doors of various kinds, rolling shutters, and other horizontally or vertically sliding, moving, or pivoting doors, gates, arms, and the like) between at least a first position and a second position (such as between an opened and a closed position). In many application settings it is desired or required to detect when such a movable barrier encounters an obstacle and to respond accordingly (such as by ceasing movement or by reversing movement away from the detected obstacle). Many movable barrier operators detect applied force when moving a corresponding movable barrier to facilitate the detection of an obstacle in the path of the movable barrier. For example, a presently sensed force reading that exceeds a predetermined allowable force level can evidence the presence of such an obstacle.

Unfortunately, the amount of force reasonably required to initiate or maintain movement of a given movable barrier typically changes with a multitude of factors. These include but are not limited to a specific present location of the movable barrier with respect to its track, temperature, humidity, age, oxidation, presence or lack of lubricity or contaminants, and so forth. Therefore, a single maximum applied force threshold will sometimes prove unsatisfactory, as such a universal threshold can be too low to accommodate applied force needs under some circumstances and inappropriately high under other circumstances.

Therefore, movable barrier operators that use multiple applied force thresholds are available to better meet such challenging circumstances. In some embodiments the movable barrier operator uses different force thresholds during different travel segments. So configured the movable barrier operator uses a force threshold that will hopefully more appropriately correspond to the actual force requirements of a given movable barrier system at various locations during the controlled movement of that movable barrier. For example, a system that parses movable barrier travel into two discrete segments offers an opportunity to use two different corresponding force thresholds that better reflect the force requirements of a given installation.

Of course, the more segments that are supported, the more accurately one can provide a corresponding maximum force threshold. That is, the maximum force threshold can more closely track the normal expected force requirements exhibited by a given movable barrier. This, in turn, can yield improved sensitivity and/or reliable detection of obstacles. By providing maximum permitted thresholds that track relatively closely with expected force requirements, deviant performance is more readily and quickly sensed.

Unfortunately, supporting a high number of travel segments (and hence a high quantity of corresponding force information) corresponds to a large quantity of data. Movable barrier operators, however, comprise a relatively price-sensitive commodity. Providing a large memory to support retention of a large quantity of force-related information will typically increase the relative cost of the movable barrier operator. This has the general effect of precluding the use of high-resolution force-sensitive capability in lower tier movable barrier operators and hence denying the corresponding systems the benefits of such an approach.

BRIEF DESCRIPTION OF THE DRAWINGS

The above needs are at least partially met through provision of the movable barrier operator compressed information method and apparatus described in the following detailed description, particularly when studied in conjunction with the drawings, wherein.

Skilled artisans will appreciate that common but well-understood elements that are useful or necessary in a commercially feasible embodiment are typically not depicted in order to facilitate a less obstructed view of these various embodiments.

DETAILED DESCRIPTION

Generally speaking, pursuant to these various embodiments, a movable barrier operator comprises at least a first memory that retains compressed data that corresponds to force data as regards movement of a movable barrier and a second memory that includes at least a portion of the compressed data in uncompressed form (for example, during use). Depending upon the particular embodiment, the first and second memory can share a common memory platform or can be distributed as appropriate to the needs and capacity of a given implementation. A wide variety of compression techniques can be used successfully in this application. Also, optionally, the compression rate and/or the type of compression can be selected from amongst a plurality of candidate rates and/or types to dynamically suit available capacity or expected needs.

So configured, a given movable barrier operator can detect force as it corresponds to travel of a movable barrier to provide sensed force information (during, for example, a learn mode of operation). That movable barrier operator can then compress information that corresponds to at least some of the sensed force information to provide compressed information. The latter is then stored. During subsequent use, the movable barrier operator retrieves the compressed information and uncompresses it to permit appropriate use thereof.

It will be understood that various kinds of force information can be well accommodated by these embodiments including, but not limited to, one or more running filter values of previously read data.

Such a movable barrier operator can retain a considerably larger quantity of force-related data than is presently expected by operator designers. As a result, such an operator can support considerably improved position/force tracking than counterpart otherwise-equivalent platforms. Also, in addition to the ability to store a considerable amount of data that corresponds to a high resolution view of movable barrier travel, these teachings further permit storing multiple sets of such information. This, in turn, permits storage (and usage) of force information data sets as correspond to varying operating conditions. For example, pursuant to one embodiment, a first full set of high resolution force information as pertains to typical summer weather can be stored along with a second full set of high resolution force information that pertains to typical winter weather conditions. These and other benefits will become evident upon making a thorough review and study of these teachings.

Figure 1:
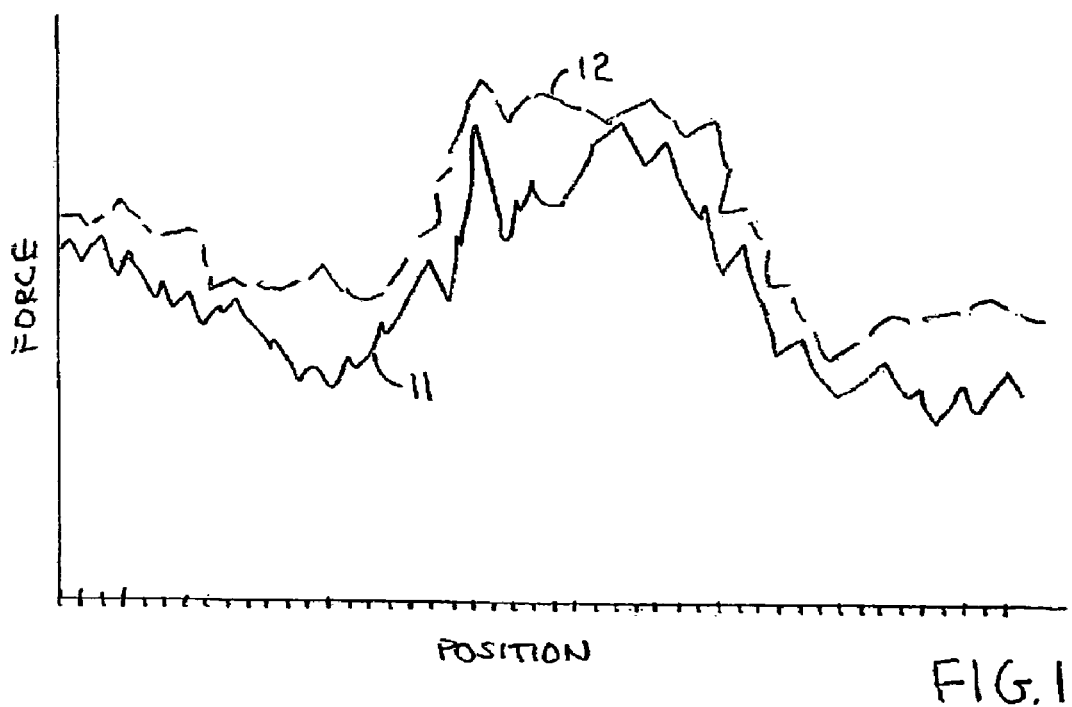
FIG. 1 comprises a graph depicting illustrative required applied force as corresponds to the position of a given movable barrier.

Referring now to the drawings, and in particular to FIG. 1, it can be seen that applied force as is required to effect selective movement of a given movable barrier can vary considerably with respect to the location of that movable barrier with respect to the track or other pathway that guides the travel of the movable barrier. The graph line denoted by reference numeral 11 depicts, as an illustrative example, the force required, from incremental position to incremental position, to move a given movable barrier in a desired fashion during a typical summer day. In a similar manner, the graph line denoted by reference numeral 12 illustrates, as an example, the force required, from incremental position to incremental position, to move that same movable barrier in a desired fashion during a typical winter day. Not untypically it can be seen that more force is often required to effect such movement when ambient temperatures are lower on average. It can also be seen that these two curves are not offset from one another by a constant amount.

It should be evident that better and more accurate applied-force tracking can be expected when force thresholds are used that apply only to a relatively small portion of movable barrier travel (hence increasing the total number of force thresholds that are required to apply with relevance to the entire travel distance of the movable barrier). It should also be evident that applied force requirements can and will vary with external causes and conditions and that any given force threshold for any particular movable barrier position may not be appropriate for that same position under different operating conditions. Pursuant to these embodiments, by improving the effective storage capacity of a given movable barrier operator, a system designer has the opportunity to store such information and attain such benefits without also unduly increasing the cost of the overall platform.

Figure 2:
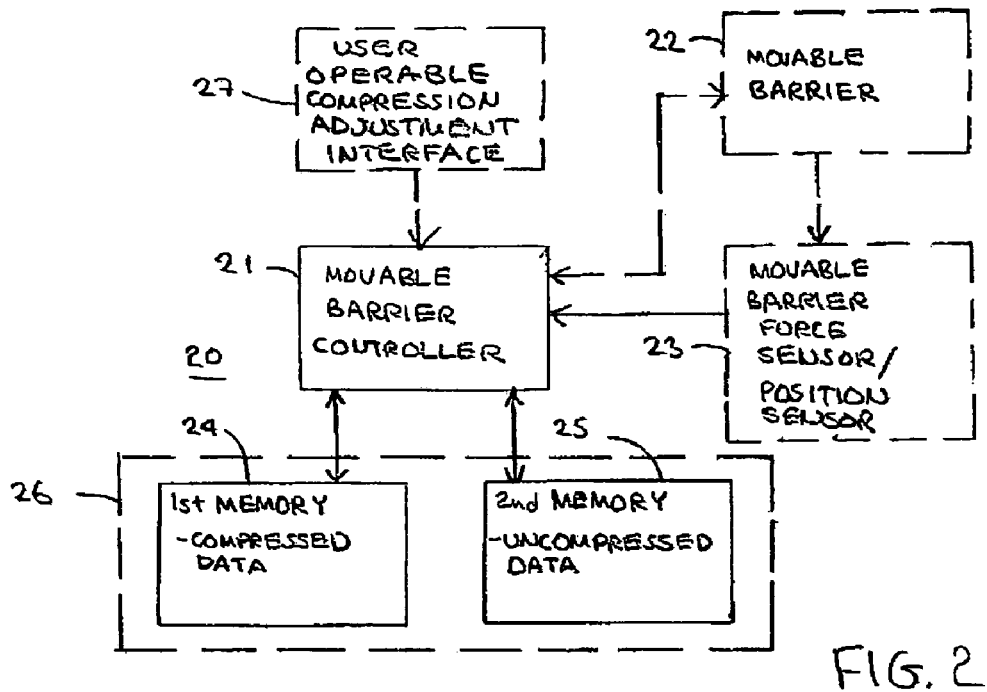
FIG. 2 comprises a block diagram as configured in accordance with various embodiments of the invention.

Referring now to FIG. 2, a representative embodiment of a system 20 comprises a movable barrier controller 21 that serves to selectively control the movement of a movable barrier 22. For example, such a movable barrier controller 21 can selectively move the movable barrier back and forth between a fully opened position and a fully closed position. (Movable barriers and movable barrier controllers are well known in the art, as are numerous ways to operably couple one to the other to facilitate such controlled movement. Because these teachings are not dependent upon any particular movable barrier or movable barrier controller, either presently known or hereafter developed, the specifics of any particular such system will not be related here for the sake of brevity and clarity.)

In this embodiment, at least one movable barrier force sensor 23 responds to indicia of force as applied to the movable barrier 22 and provides corresponding force information to the movable barrier controller 21. There are numerous known force sensors and these include magnetic-based sensors and optical-based sensors (which typically respond to rotational movement as imparted to move the movable barrier 22) and other approaches. Such sensors typically serve to provide a signal (such as an analog voltage or current signal or a digital signal comprising a value) that constitutes a direct measure of presently (or recently) applied force or some indicia thereof. For example, current draw by a motor that moves the movable barrier can sometimes be used as a relatively direct indicator of applied force. As another example, speed of barrier movement (and/or acceleration or deceleration) can be used as an indirect indicator of applied force. In general, these embodiments are not particularly sensitive to or dependent upon use of any particular force sensor. Therefore, again, further specifics regarding such force sensors will not be presented for the sake of brevity and clarity.

A preferred embodiment will also typically include a position sensor to determine a present position of the movable barrier. In many cases the position sensor and force sensor are one and the same as suggested by the illustration. For example, an optically-based drive shaft rotation sensor can serve to provide information both with respect to present movement and as regards presently applied force. In other cases, discrete and separate sensors can be used to provide information regarding applied force and present position. Such options and alternatives are well understood by those skilled in the art.

So configured, and in accord with known technique, such a movable barrier controller 21 can obtain readings from the movable barrier force sensor 23 during controlled movement of the movable barrier 22 (during, for example, a learn mode of operation as is understood in the art) to develop applied force information for various positions of the movable barrier during movement thereof. Such information can then be used, either in its present form or as modified or translated to suit a given analysis or monitoring methodology of choice, to develop a corresponding plurality of force information data.

Pursuant to a preferred embodiment, the movable barrier controller 21 will then compress part or all of the resultant force information data. Such compression can be effected in a variety of ways. The movable barrier controller 21 itself can comprise a data compressor and/or the movable barrier controller 21 can rely in part or wholly upon some outboard data compressor to effect this functionality. In general, many movable barrier controllers comprise a partially or fully programmable platform. In such a case, it may be most convenient and cost effective to program the movable barrier controller to effect the compression technique of choice.

As will be noted below in more detail, in some embodiments the system 20 may have more than a single compression scheme available for use in this manner. In such an embodiment the differing compression engines can be all retained within the movable barrier controller 21, or be fully contained within an outboard platform (not shown), or distributed between the movable barrier controller 21 and such an outboard platform as desired or appropriate to the needs and capabilities of a given application. Such architectural choices are well understood in the art and require no further elaboration here.

The movable barrier controller 21 effects storage of the resultant compressed data in a first memory 24. Such memory can be integral to the movable barrier controller 21 or can be partially or wholly external thereto. Depending upon the effective rate of compression, this compressed data can consume considerably less memory space than the uncompressed force information. For example, a compression ratio of eight to one will permit up to eight times more force information to be stored in a given memory than is achievable with uncompressed data. This additional storage space can be used in various beneficial ways. As one example, a higher resolution view of the travel of the movable barrier can be accommodated. As another example, differing views of movable barrier movement (during different environmental conditions, for example) can be accommodated.

During use, the movable barrier controller 21 retrieves compressed data as needed from the first memory 24 and uncompresses that compressed data. That uncompressed data can be stored, for example, in a second memory 25 such as a buffer memory as may be available onboard the movable barrier controller 21 or external thereto. (Pursuant to one embodiment, both the first memory 24 and the second memory 25 can comprise parts of a shared memory platform 26.) That uncompressed data can then be used by the movable barrier controller 21 to assess whether force as is currently being applied to effect movement of the movable barrier comprises an excessive amount or an acceptable amount of force. (Use of force-based information for such purposes is well understood in the art and requires no further elaboration here.)

So configured, such a system comprises an operator to control movement of a movable barrier, a force sensor to detect an amount of force as is currently being applied to effect movement of that movable barrier, a position determination sensor to determine a present respective position of that movable barrier, a data compressor to compress force information and to thereby provide compressed force information, and a memory to store the compressed force information as well as a portion of the compressed force information in uncompressed form to render such force information suitable for current use.

Figure 3:
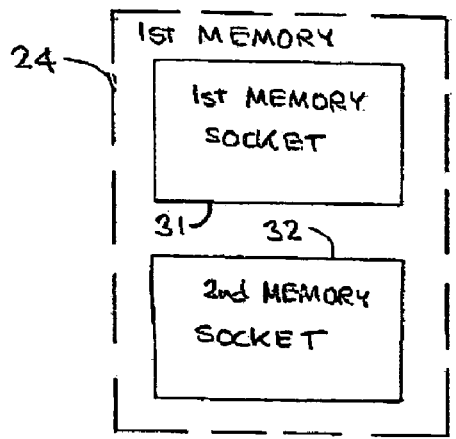
FIG. 3 comprises a block diagram as configured in accordance with an embodiment of the invention.

Referring now to FIG. 3, in one optional embodiment, the first memory 24 can be comprised of a plurality of memory sockets. For purposes of illustration, two such memory sockets are depicted; a first memory socket 31 and a second memory socket 32. Such sockets serve to receive a memory integrated circuit in a manner well understood in the art. So configured, a given moveable barrier operator system can be deployed with memory parts residing in only one or both such sockets. Or, if desired, memory parts can be readily changed even subsequent to installation by simply removing a memory part from such a socket and replacing it with another memory part. In this way, memory capacity for a given movable barrier operator can be readily increased when desired.

So configured, and when the movable barrier controller 21 has a plurality of available data compression schemes and/or compression rates, the movable barrier controller 21 can select a particular data compression approach as a function, at least in part, of whether a memory part is operably disposed in one or more of these memory sockets and/or as a function, at least in part, of the quantity of memory that is otherwise available. For example, when little memory is available, a compression scheme and/or compression rate that yields a high compression ratio may be appropriately selected. Conversely, when abundant memory is available, less compression may nevertheless yield satisfactory results.

In addition to enabling automatic adjustment of the compression process, and referring again to FIG. 2, it may be desirable to support some user control over this operational characteristic. A user operable compression adjustment interface 27 comprises one optional way to facilitate this control. Such an interface 27 can comprise any suitable mechanism and can comprise, but is not limited to, a hand or finger manipulable or responsive object, a voice responsive input, a cursor manipulation mechanism, and so forth. Such an interface 27 can be made readily available on the exterior of the movable barrier operator 20 or can be disposed within the housing of the latter to discourage inadvertent manipulation of the interface 27.

Such an interface 27 can be used in various ways as appropriate to the needs and capabilities of a given application. For example, such an interface 27 can be used to permit a user to specify use of a given compression scheme from amongst a plurality of compression schemes when such are available. As another example, such an interface 27 can serve to permit selection of a particular compression rate when using a compression scheme having a scalable rate of compression.

Figure 4:
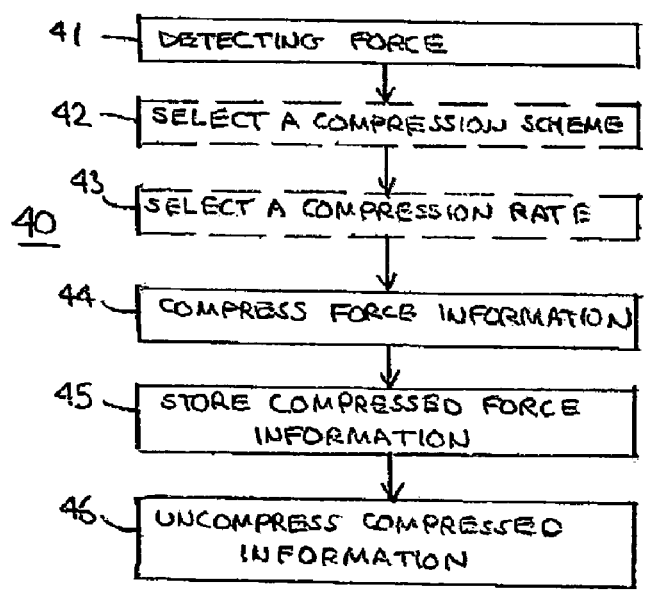
FIG. 4 comprises a flow diagram as configured in accordance with various embodiments of the invention.

The embodiments presented above, or any other suitable platform, can serve to effect the processes depicted in FIG. 4. Pursuant to such a process 40, and during, for example, a learn mode of operation as is otherwise understood in the art, a movable barrier operator can detect 41 force as corresponds to travel of a movable barrier during at least portions of the travel to provide sensed force information. Such measurements can be taken as often or as infrequently as corresponds to the force measurement scheme being employed. In general, however, discrete force measurements that correspond to smaller travel segments tend to yield a more accurate model of the force requirements of the movable barrier. Depending upon the force measurement scheme being employed, such force measurements can be captured at predetermined movable barrier positions, at predetermined time intervals, on a substantially continuous basis, and so forth.

Pursuant to some embodiments, a plurality of compression schemes may be available. In general, many different compression schemes will serve to effect the desired compression. For example, delta compression schemes (where only incremental changes from one measurement to the next are recorded), dictionary compression schemes (where codes, symbols, vectors, or the like that correspond to a defined measurement are used to represent the measurement itself), run-length encoding schemes (where a given measured amplitude is correlated to a particular corresponding duration of presence), and virtually any other common compression scheme will all serve potentially well in a given setting. When such a plurality of candidate compression schemes are available, the process 40 can optionally select 42 a given compression scheme from amongst the plurality of compression schemes. This selection can reflect a user specified choice (as directed, for example, by a user operable compression adjustment interface as noted above) or can reflect an automatic selection process. For example, a given compression scheme can be automatically selected on the basis of how much memory is available to store the force information or on an expected force sensing rate.

Just as there may be a plurality of available compression schemes, many given compression schemes are scalable to some extent. That is, the compression ratio effected by the compression scheme can be selectively varied. For example, a given compression scheme may selectively yield any of a two to one, a four to one, and an eight to one compression ratio. When such is the case, the process 40 may also optionally permit selection 43 of a given compression ratio. Selection of a given compression ratio can be determined by a user input and/or as based upon an automatic selection process. Again, for example, a given compression rate can be selected from amongst a plurality of compression rates as a function, at least in part, of available memory resources or a force sensing rate.

The process 40 then compresses 44 at least some and preferably all of the information that corresponds to the sensed force information to provide compressed force information. Such compression can occur in relative real time (as the force information becomes available) or in a batch process (for example, once all of the expected force information has become available) as appropriate to the selected compression scheme, the available processing resources, and so forth in accord with well understood compression practice. Such compressed force information is then stored 45 to permit later retrieval and usage. Later, and typically on an as-needed basis, the process 40 retrieves the compressed force information from memory and uncompresses 46 the compressed force information. If desired, all of the force information can be decompressed in bulk, but more typically it may be appropriate to only uncompress a fraction of the compressed information at any given moment. In particular, it may be helpful to only uncompress that information as is presently usable to analyze and test presently measured force information.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A movable barrier operator comprising:
   a movable barrier controller;
   at least a first movable barrier force sensor input operably coupled to the movable barrier controller;
   a first memory operably coupled to the movable barrier controller, which first memory at least includes compressed data that corresponds to force data as regards movement of a movable barrier;
   a second memory operably coupled to the movable barrier controller, which second memory at least includes at least a portion of the compressed data in uncompressed form.

2. The movable barrier operator of claim 1 wherein the compressed data corresponds to force information for a plurality of movable barrier positions.

3. The movable barrier operator of claim 2 wherein the compressed data further corresponds to force information for a plurality of movable barrier positions as relate to movement of the movable barrier from a first position to a second position.

4. The movable barrier operator of claim 3 wherein the first position comprises an opened position and the second position comprises a closed position.

5. The movable barrier operator of claim 3 wherein the first position comprises a closed position and the second position comprises an opened position.

6. The movable barrier operator of claim 2 wherein the compressed data further corresponds to force information for a plurality of movable barrier positions at a plurality of environmental conditions.

7. The movable barrier operator of claim 6 wherein the plurality of environmental conditions comprise a plurality of different temperatures.

8. The movable barrier operator of claim 1 wherein the compressed data is compressed as a function of a delta compression scheme.

9. The movable barrier operator of claim 1 wherein the compressed data is compressed as a function of a dictionary compression scheme.

10. The movable barrier operator of claim 1 wherein the compressed data is compressed as a function of a run-length encoding scheme.

11. The movable barrier operator of claim 1 wherein the compressed data is all compressed as a function of a common compression scheme.

12. The movable barrier operator of claim 1 wherein at least a first part of the compressed data is compressed using a first resultant compression ratio and at least a second part of the compressed data is compressed using a second resultant compression ratio that is different from the first resultant compression ratio.

13. The movable barrier operator of claim 1 wherein the movable barrier controller further comprises a data compressor.

14. The movable barrier operator of claim 13 wherein the movable barrier controller further comprises at least a first and a second data compressor, wherein the first data compression engine is different from the second data compressor.

15. The movable barrier operator of claim 1 and further comprising a user operable compression adjustment interface that is operably coupled to the movable barrier controller.

16. The movable barrier operator of claim 1 wherein the first memory further comprises at least a first memory socket.

17. The movable barrier operator of claim 16 wherein the movable barrier controller further comprises a data compressor selector that is responsive to whether a memory is operably disposed in the first memory socket.

18. A method comprising:
    at a movable barrier operator:
    detecting force as corresponds to travel of a movable barrier during at least portions of the travel to provide sensed force information;
    compressing information that corresponds to at least some of the sensed force information to provide compressed force information;
    storing the compressed force information;
    uncompressing at least some of the compressed force information.

19. The method of claim 18 wherein detecting force comprises detecting force at predetermined movable barrier positions.

20. The method of claim 18 wherein detecting force comprises detecting force at predetermined time intervals.

21. The method of claim 18 wherein detecting force comprises detecting force on a substantially continuous basis.

22. The method of claim 18 wherein compressing comprises using a delta compression scheme.

23. The method of claim 18 wherein compressing comprises using a dictionary compression scheme.

24. The method of claim 18 wherein compressing comprises using a run-length encoding scheme.

25. The method of claim 18 wherein compressing comprises using a selected compression rate from amongst a plurality of compression rates.

26. The method of claim 25 wherein using a selected compression rate from amongst a plurality of compression rates further comprises automatically selecting the selected compression rate from amongst the plurality of compression rates.

27. The method of claim 26 wherein automatically selecting the selected compression rate from amongst the plurality of compression rates further comprises automatically selecting the selected compression rate from amongst the plurality of compression rates as a function, at least in part, of memory resources.

28. The method of claim 26 wherein automatically selecting the selected compression rate from amongst the plurality of compression rates further comprises automatically selecting the selected compression rate from amongst the plurality of compression rates as a function, at least in part, of a force sensing rate.

29. The method of claim 26 wherein automatically selecting the selected compression rate from amongst the plurality of compression rates further comprises automatically selecting the selected compression rate from amongst the plurality of compression rates as a function, at least in part, of a user input.

30. The method of claim 18 wherein compressing further comprises selecting a compression scheme from amongst a plurality of compression schemes.

31. The method of claim 30 wherein selecting a compression scheme from amongst a plurality of compression schemes further comprises automatically selecting a compression scheme from amongst a plurality of compression schemes.

32. A movable barrier controller comprising:
operator means for controlling movement of a movable barrier;
force sensor means operably coupled to the operator means for detecting an amount of force as is currently being applied to effect movement of the movable barrier;
position determination means operably coupled to the operator means for determining a present respective position of the movable barrier;
data compression means operably coupled to the operator means for compressing force information to provide compressed force information;
memory means operably coupled to the operator means for storing the compressed force information and at least a portion of the compressed force information in uncompressed form.

33. The movable barrier controller of claim 32 wherein the data compression means further comprises a plurality of data compression schemes.

34. The movable barrier controller of claim 32 wherein the data compression means further comprises a plurality of resultant data compression rates.

35. The movable barrier controller of claim 32 wherein the data compression means is operably responsive to capacity of the memory means.

* * * * *